(12) United States Patent
Kang

(10) Patent No.: US 10,442,388 B2
(45) Date of Patent: Oct. 15, 2019

(54) KNEE AIRBAG APPARATUS AND METHOD FOR FOLDING THE SAME

(71) Applicant: HYUNDAI MOBIS CO., LTD., Seoul (KR)

(72) Inventor: I Seul Kang, Seongnam-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 20 days.

(21) Appl. No.: 15/690,638

(22) Filed: Aug. 30, 2017

(65) Prior Publication Data

US 2018/0056923 A1    Mar. 1, 2018

(30) Foreign Application Priority Data

Aug. 31, 2016 (KR) .................. 10-2016-0111791

(51) Int. Cl.
| | | |
|---|---|---|
| *B60R 21/237* | (2006.01) | |
| *B60R 21/206* | (2011.01) | |
| *B60R 21/2338* | (2011.01) | |
| *B60R 21/231* | (2011.01) | |
| *B60R 21/264* | (2006.01) | |
| *B60R 21/00* | (2006.01) | |

(52) U.S. Cl.
CPC .......... *B60R 21/237* (2013.01); *B60R 21/206* (2013.01); *B60R 21/231* (2013.01); *B60R 21/2338* (2013.01); *B60R 21/264* (2013.01); *B60R 2021/0051* (2013.01); *B60R 2021/23169* (2013.01); *B60R 2021/23382* (2013.01)

(58) Field of Classification Search
CPC ........ B60R 21/237; B60R 2021/23169; B60R 2021/0051
See application file for complete search history.

(56) References Cited

U.S. PATENT DOCUMENTS

| | | | | | |
|---|---|---|---|---|---|
| 5,178,407 | A | * | 1/1993 | Kelley | B60R 21/231 280/728.1 |
| 5,419,579 | A | * | 5/1995 | McPherson | B60R 21/231 280/743.1 |
| 5,531,477 | A | * | 7/1996 | Madrigal | B60R 21/201 280/743.1 |
| 6,739,622 | B2 | * | 5/2004 | Halford | B60R 21/237 280/743.1 |
| 7,232,153 | B2 | * | 6/2007 | Kawauchimaru | B60R 21/237 280/730.1 |
| 8,540,276 | B2 | * | 9/2013 | Schneider | B60R 21/206 280/730.1 |
| 2002/0070541 | A1 | * | 6/2002 | Hawthorn | B60R 21/237 280/743.1 |
| 2002/0171230 | A1 | * | 11/2002 | Takimoto | B60R 21/206 280/730.1 |
| 2004/0201209 | A1 | * | 10/2004 | Schwark | B60R 21/231 280/743.1 |

(Continued)

*Primary Examiner* — James A English
(74) *Attorney, Agent, or Firm* — Knobbe Martens Olson & Bear LLP

(57) ABSTRACT

A method for folding a knee airbag apparatus may include: folding an upper portion of an airbag cushion part a plurality of times; stacking a main folding part and a pair of side folding parts by folding both side portions of the airbag cushion part folded the plurality of times toward the center; and stacking a cover folding part over the pair of side folding parts by folding a lower portion of the airbag cushion part.

2 Claims, 20 Drawing Sheets

(56) References Cited

U.S. PATENT DOCUMENTS

| | | | | |
|---|---|---|---|---|
| 2004/0251669 A1* | 12/2004 | Fischer | ............... | B60R 21/237 280/743.1 |
| 2009/0256340 A1* | 10/2009 | Williams | ............. | B60R 21/237 280/741 |
| 2012/0025496 A1* | 2/2012 | Schneider | ............ | B60R 21/201 280/728.2 |
| 2016/0052480 A1* | 2/2016 | Jung | ................... | B60R 21/206 280/730.1 |

* cited by examiner

KNEE AIRBAG APPARATUS AND METHOD FOR FOLDING THE SAME

CROSS-REFERENCES TO RELATED APPLICATIONS

The present application claims priority to Korean application number 10-2016-0111791, filed on Aug. 31, 2016, which is incorporated by reference in its entirety.

BACKGROUND OF THE INVENTION

The present invention relates to a knee airbag apparatus and a method for folding the same, and more particularly, a knee airbag apparatus and a method for folding the same, which are capable of preventing an airbag cushion part from turning or swaying while the airbag cushion part is deployed.

In general, a vehicle includes an airbag installed to protect a passenger. The airbag may be installed at various positions depending on a body part to be protected. A knee airbag is disposed in front of a front seat. The knee airbag includes an airbag cushion part which is folded in a housing. The airbag cushion part includes a main folding part formed by folding the airbag cushion part a plurality of times in the widthwise direction of an inflator and side folding parts formed by folding both sides of the airbag cushion part in the longitudinal direction of the inflator.

Since the inflator has an outlet formed at one end or one side thereof, the outlet of the inflator is connected to one side of the airbag cushion part. Thus, since gas is first supplied to the side folding part at the one side, the deployment speed of the side folding part at the other side becomes different from the deployment speed of the side folding part at the one side. Therefore, the deployment of the airbag cushion part may be delayed, and the airbag cushion part may turn or sway to the side when the airbag cushion part is deployed.

The related art is disclosed in Korean Patent Registration No. 1406608 registered on Jun. 3, 2014 and entitled "Knee airbag of vehicle glove box".

SUMMARY OF THE INVENTION

Embodiments of the present invention are directed to a knee airbag apparatus and a method for folding the same, which are capable of preventing an airbag cushion part from turning or swaying while the airbag cushion part is deployed.

In one embodiment, a method for folding a knee airbag apparatus may include: folding an upper portion of an airbag cushion part a plurality of times; stacking a main folding part and a pair of side folding parts by folding both side portions of the airbag cushion part folded the plurality of times toward the center; and stacking a cover folding part over the pair of side folding parts by folding a lower portion of the airbag cushion part.

The main folding part may be formed by folding the upper portion of the airbag cushion part the plurality of times in a zigzag manner.

The side folding parts may be connected to ends portions of the main folding part which is formed by folding the upper portion of the airbag cushion part the plurality of times in a zigzag manner, and folded toward the main folding part so as to be stacked over the main folding part.

Each side folding parts may be connected to ends portions of the main folding part which is formed by folding the upper portion of the airbag cushion part the plurality of times in a zigzag manner, and folded toward the main folding part so as to be stacked over the main folding part.

The cover folding part may cover the side folding part in the opposite direction of the direction that the main folding part is folded.

The main folding part may be positioned at one surface of the airbag cushion part, and the side folding parts may be formed by folding the side portions of the airbag cushion part toward the opposite surface of the airbag cushion part.

The main folding part may be formed by folding the upper portion of the airbag cushion part the plurality of times, and each of the side folding parts may be formed by folding the corresponding side portion connected to the main folding part toward the center and then folding the side portion toward the opposite side.

The side folding parts may be formed by folding both side portions toward the center and the opposite side in a zigzag manner.

In another embodiment, a knee airbag apparatus may include: a housing having an opening formed therein; a door for closing the opening; an inflator installed in the housing and configured to inject gas; and an airbag cushion part installed in the housing, and connected to the inflator. The airbag cushion part may include: a main folding part formed by folding an upper portion of the airbag cushion part a plurality of times; a pair of side folding parts connected to both ends of the main folding part, and folded toward the main folding part; and a cover folding part formed by folding a lower portion of the airbag cushion part toward the side folding parts.

The main folding part may be formed by folding the upper portion of the airbag cushion part in a zigzag manner.

The cover folding part may cover the side folding part in the opposite direction of the direction that the main folding part is folded, based on the inflator.

The side folding parts may be stacked over the main folding part while being in contact with the main folding part, and the cover folding part is stacked over the side folding parts while being contact with the side folding parts. Among the main folding part, the side folding parts and the cover folding part, the cover folding part may be disposed the closest to the door.

The cover folding part may open the door that closes the opening of the housing, when the airbag cushion part is deployed.

The inflator may be connected to the main folding part and the cover folding part.

The side folding parts may be formed by folding portions connected to both ends of the main folding part in a zigzag manner.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
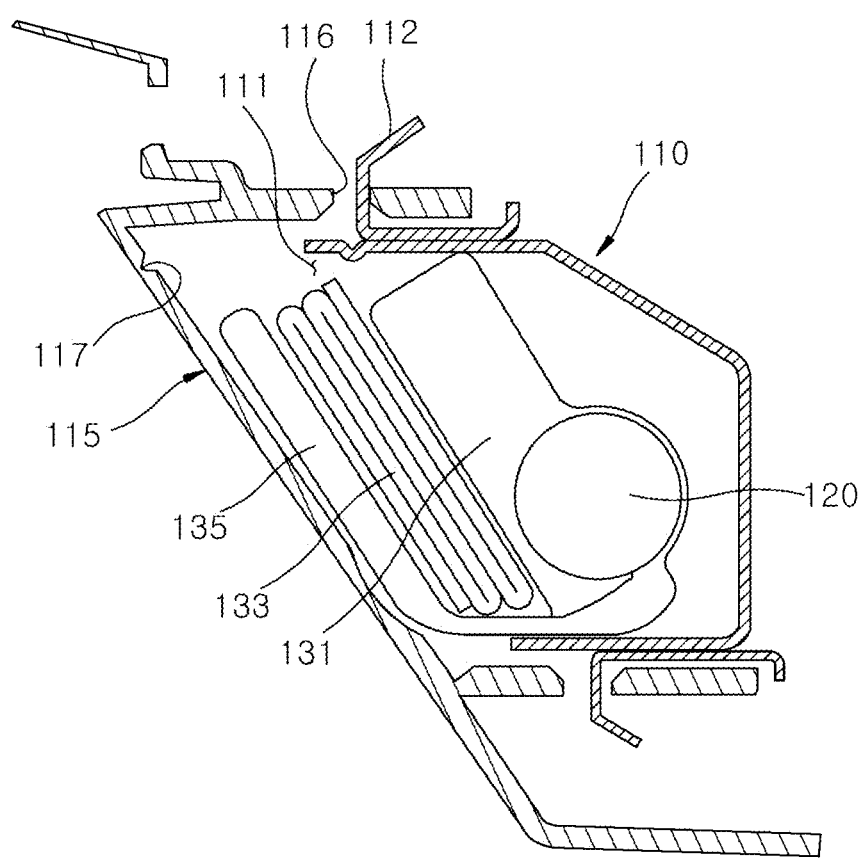
FIG. 1 is a cross-sectional view of a knee airbag apparatus in accordance with an embodiment of the present invention.
Figure 2:
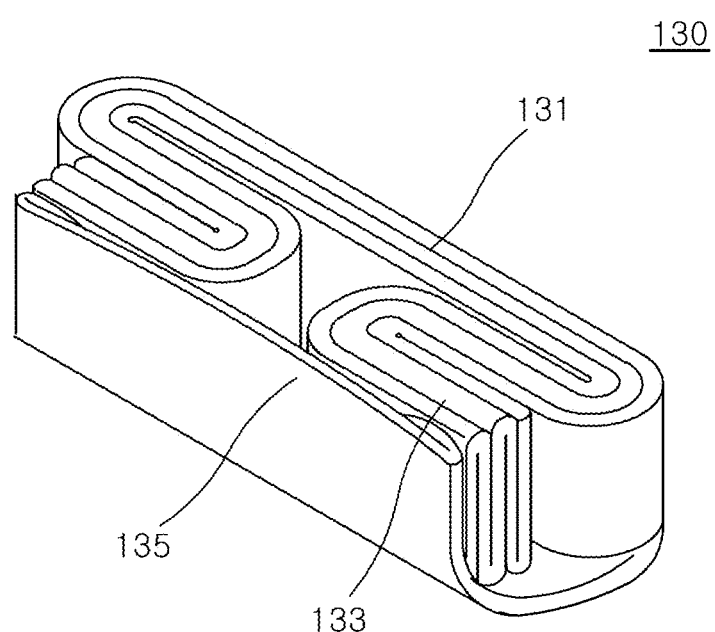
FIG. 2 is a perspective view illustrating that an airbag cushion part is folded in the knee airbag apparatus in accordance with the embodiment of the present invention.
Figure 3:
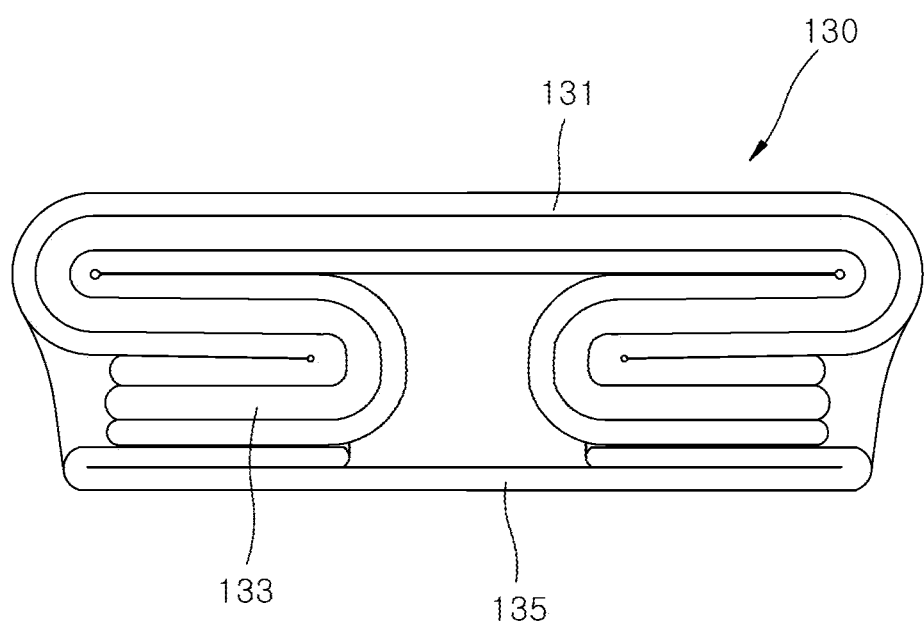
FIG. 3 is a plan view illustrating that the airbag cushion part is folded in the knee airbag apparatus in accordance with the embodiment of the present invention.

FIG. 1 is a cross-sectional view of a knee airbag apparatus in accordance with an embodiment of the present invention, FIG. 2 is a perspective view illustrating that an airbag cushion part is folded in the knee airbag apparatus in accordance with the embodiment of the present invention, and FIG. 3 is a plan view illustrating that the airbag cushion part is folded in the knee airbag apparatus in accordance with the embodiment of the present invention. FIGS. 4A to 4F are plan views sequentially illustrating that the airbag cushion part is folded in a zigzag manner in the knee airbag apparatus in accordance with the embodiment of the present invention, FIGS. 5A to 5E are plan views sequentially illustrating that both sides of the airbag cushion part are folded to define a main folding part and side folding parts, after the airbag cushion part was folded in a zigzag manner in the knee airbag apparatus in accordance with the embodiment of the present invention, and FIGS. 6A and 6B are plan views sequentially illustrating that the airbag cushion part is folded to form a cover folding part in the knee airbag apparatus in accordance with the embodiment of the present invention.

Referring to FIGS. 1 to 6, the knee airbag apparatus in accordance with the embodiment of the present invention includes an inflator 120 and an airbag cushion part 130.

A housing 110 may have an opening 111 formed at a front seat (left side in FIG. 1) on which a passenger is seated. The housing 110 may have a hook part 112 formed at the top thereof. The inflator 120 and the airbag cushion part 130 may be embedded in the housing 110.

A door 115 may be openably/closably installed at the opening 111 of the housing 110. The door 115 may have a locking part 116 formed at the top thereof, such that the locking part 116 is locked to the hook part 112. The door 115 may have a cutting induction part 117 which can be torn or cut by an expansion force of the cover folding part 135. When the locking part 116 is locked to the hook part 112, the door 115 may close the opening of the housing 110.

The inflator 120 may be installed in the housing 110, and serve to inject gas. The inflator 120 has a gas outlet (not illustrated) formed at one side thereof. The inflator 120 may have various shapes as long as the inflator 120 can generate gas.

The airbag cushion part 130 may be connected to the inflator 120, and folded and installed in the housing 110. An upper portion of the airbag cushion part 130 (based on FIG. 4) may be folded a plurality of times, and both side portions of the folded airbag cushion part 130 may be folded toward the central portion of the airbag cushion part 130. The airbag cushion part 130 may have a plurality of sewing lines 132 separated from each other. Each of the sewing lines 132 may be connected to an inner tether (not illustrated) so as to limit an expansion thickness of the airbag cushion part 130.

The airbag cushion part 130 may include a main folding part 131, a pair of side folding part 133 and a cover folding part 135.

The main folding part 131 may be formed by folding the upper portion of the airbag cushion part 130 a plurality of times in a zigzag manner.

The side folding parts 133 may be formed by folding both side portions of the airbag cushion part 130 toward the main folding part 131, after the upper portion of the airbag cushion part 130 was folded the plurality of times in a zigzag manner. That is, the central portion of the airbag cushion part 130 folded the plurality of times may be defined as the main folding part 131, and the side portions which are connected to the central portion and additionally folded may be defined as the side folding parts 133.

In other words, the central portion of the structure formed by folding the upper portion of the airbag cushion part 130 the plurality of times in a zigzag manner may be set to the main folding part 131, and both side portions of the structure may be set to the side folding parts 133. Referring to FIG. 5E, the central portion of the airbag cushion part 130 may correspond to the main folding part 131, and both side portions of the airbag cushion part 130 may correspond to the pair of side folding parts 133.

Therefore, the main folding part 131 and the side folding parts 133 may be connected to each other. When the airbag cushion part 130 is completely folded, the side folding parts 133 may be disposed in front of the main folding part 131 (refer to FIG. 2).

The main folding part 131 may be disposed between both side portions of the structure formed by folding the upper portion of the airbag cushion part 130 the plurality of times. The main folding part 131 may be formed by folding the airbag cushion part 130 four to six times.

The pair of side folding parts 133 may be formed by folding both side portions of the airbag cushion part 130 toward the longitudinal central portion of the inflator 120 (the central portion of the main folding part 131) and then folding the folded side portions in the opposite directions. Since the side folding parts 133 are formed by folding the side portions of the airbag cushion part 130 two times, the side folding parts 133 may be deployed from both sides of the airbag cushion part 130.

The main folding part 131 may be positioned at one surface of the airbag cushion part 130, and the side folding parts 133 may be folded toward the other surface of the airbag cushion part 130. The main folding part 131 and the side folding parts 133 may be disposed at the opposite sides, based on a portion of the airbag cushion part 130, which is not folded.

The cover folding part 135 may be formed by folding the lower portion of the airbag cushion part 130 (based on FIG. 6) over the pair of side folding parts 133. The cover folding part 135 may cover the pair of side folding parts 133 such that the pair of side folding parts 133 can be symmetrically deployed.

FIG. 6A illustrates that the cover folding part 135 is not yet folded. FIG. 6B illustrates that the cover folding part 135 is folded to cover the pair of side folding parts 133. Therefore, when gas is injected into the airbag cushion part 130 by the operation of the inflator 120, the cover folding part 135 may block the side folding parts 133 until the door 115 is opened, thereby temporarily restricting a deployment of the side folding parts 133. Then, when the cover folding part 135 is continuously expanded to press and open the door 115, the pair of side folding parts 133 can be symmetrically deployed to prevent the airbag cushion part 130 from turning or swaying during the deployment. That is, the pair of side folding parts 133 can be symmetrically deployed by the cover folding part 135 when the airbag cushion part 100 is deployed.

The cover folding part 135 may be folded to cover the side folding parts 133 in the opposite direction of the direction that the main folding part 131 is folded, based on the inflator 120. Since the cover folding part 135 covers the side folding parts 133 in the opposite direction of the direction that the main folding part 131 is folded, gas injection may be concentrated on the cover folding part 135 at the initial stage that the gas is injected from the inflator 120. Therefore, as the cover folding part 135 is deployed while expanded faster than the side folding parts 133 or the main folding part 131, the door 115 may be opened before the side folding parts 133 are deployed.

The cover folding part 135 may be stacked at the foremost position in the deployment direction of the airbag cushion part 130 in order to open the door 115 of the housing 110 when the cover folding part 135 is deployed. At this time, the cover folding part 135 may be disposed at the door 115 so as to be expanded and deployed before the side folding parts 133. Therefore, the cover folding part 135 may be deployed before the side folding parts 133, and the door 115 may be opened by the expansion force of the cover folding part 135. When the door 115 is opened, the cover folding part 135 may remove the pressing of the side folding part 133.

At this time, the side folding parts 133 may be expanded and unfolded to the outside of the housing 110, and the side folding parts 133 and the main folding part 131 may be unfolded and deployed. Since the pair of side folding parts 133 are deployed after the cover folding part 135 is deployed, the pair of side folding parts 133 may be symmetrically deployed. Therefore, since gas injection can be prevented from being concentrated on the side folding part 133 at one side, the airbag cushion part 130 can be prevented from turning or saying during the deployment.

Hereafter, a method for folding a knee airbag apparatus in accordance with an embodiment of the present invention will be described with reference to FIGS. 4 to 6.

Figure 4A:
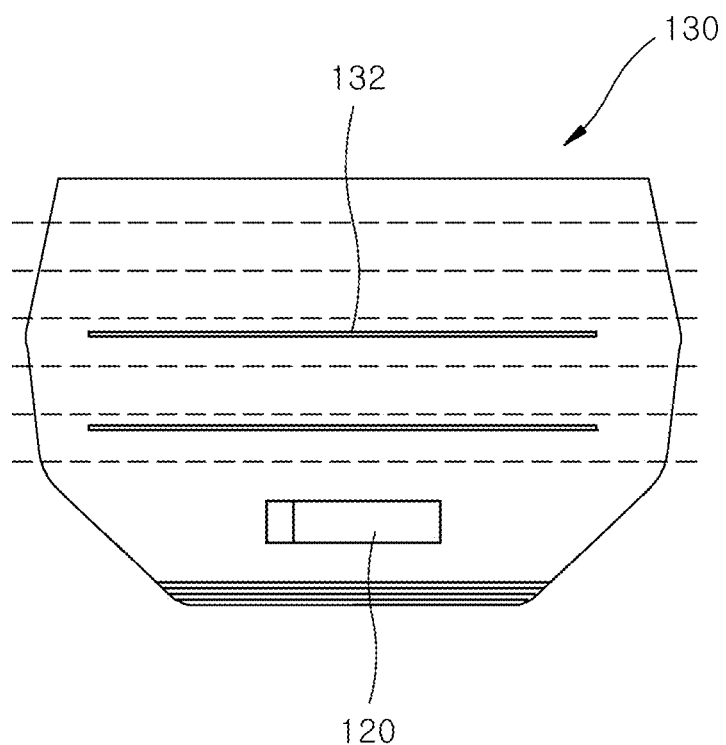
FIGS. 4A to 4F are plan views sequentially illustrating that the airbag cushion part is folded in a zigzag manner in the knee airbag apparatus in accordance with the embodiment of the present invention.
Figure 5A:
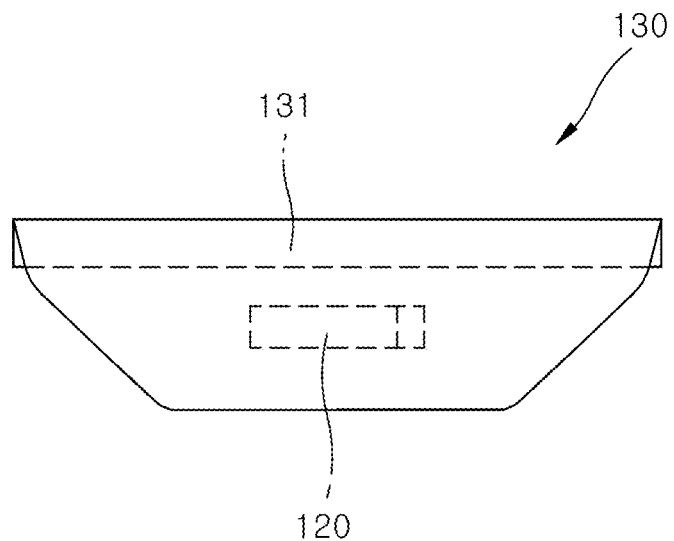
FIGS. 5A to 5E are plan views sequentially illustrating that both sides of the airbag cushion part are folded to define a main folding part and side folding parts, after the airbag cushion part was folded in a zigzag manner in the knee airbag apparatus in accordance with the embodiment of the present invention.

First, as illustrated in FIG. 4A, the airbag cushion part 130 may be spread. At this time, the airbag cushion part 130 may be connected to the inflator 120. The upper portion of the airbag cushion part 130 (based on FIG. 4A) may be folded a plurality of times in a zigzag manner.

Figure 4B:
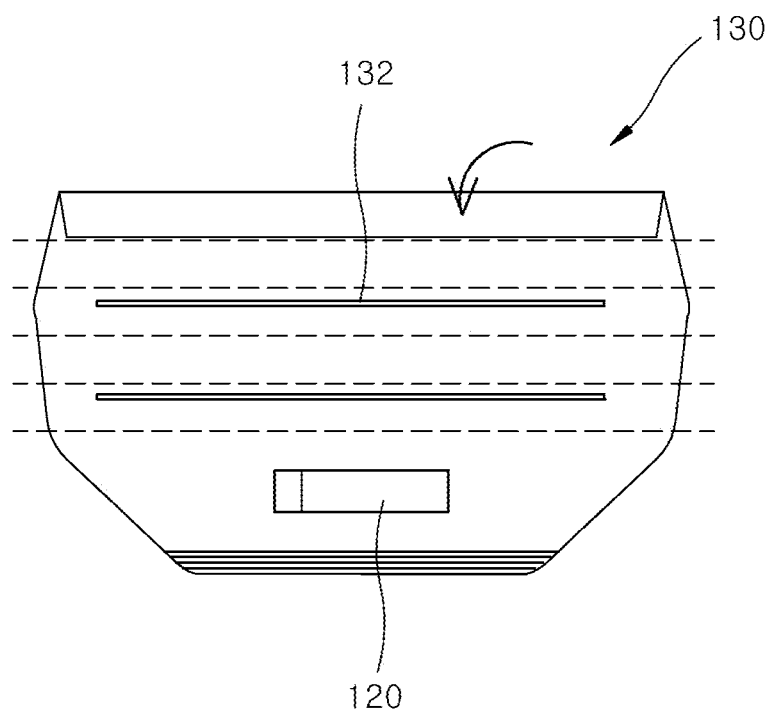
Figure 4C:
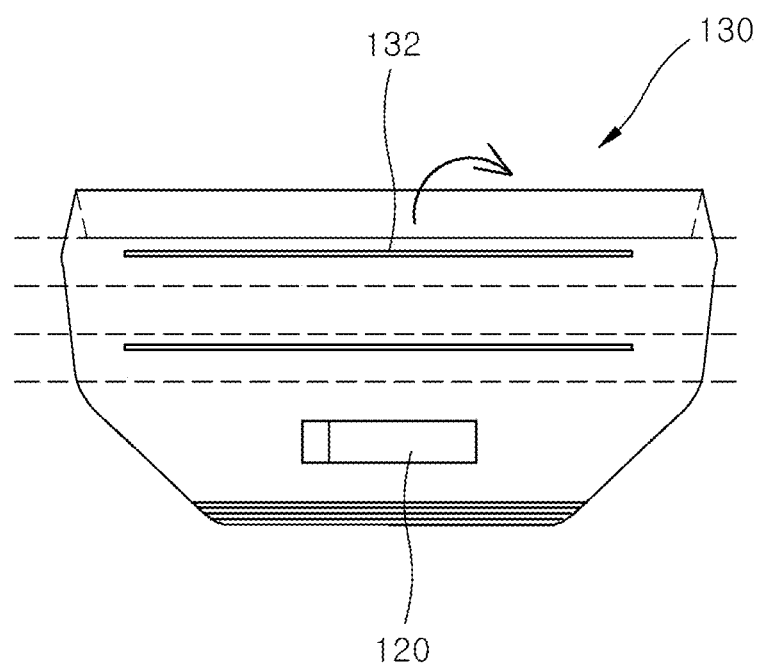
Figure 4D:
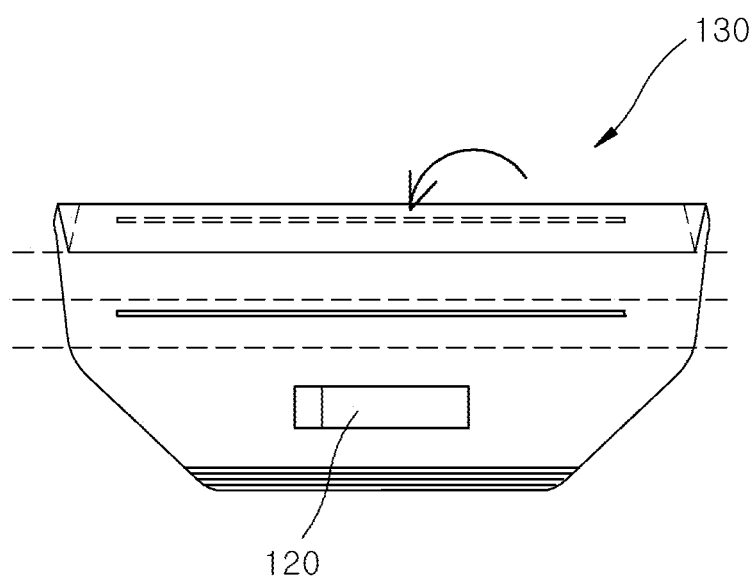
Figure 4E:
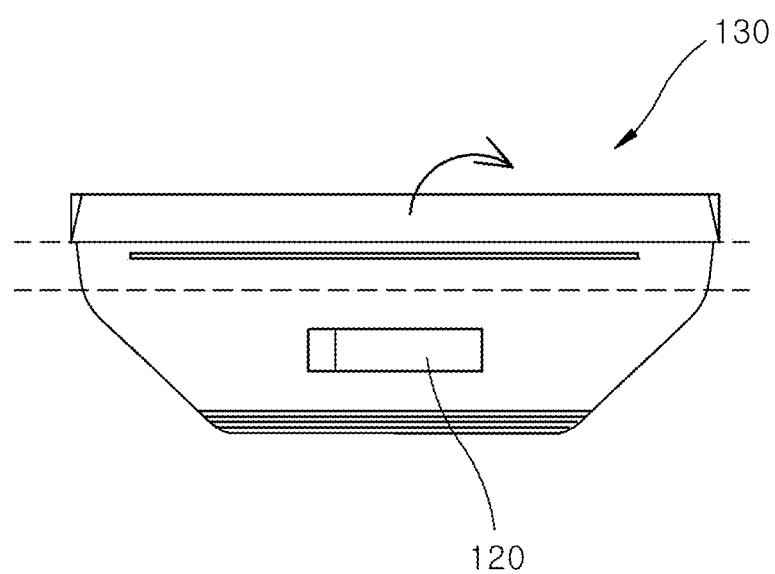
Figure 4F:
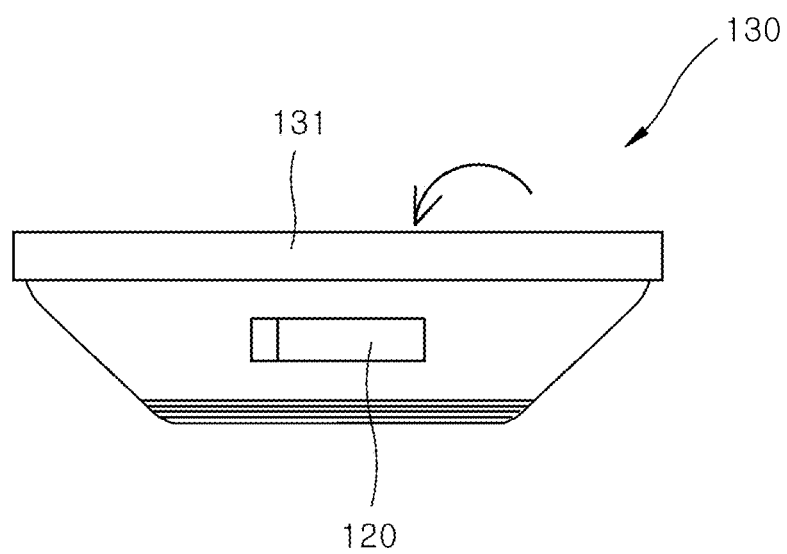

In other words, as illustrated in FIG. 4B, the upper portion of the airbag cushion part 130 may be folded in a band shape in one direction that the folded portion is located at the front surface. Then, as illustrated in FIG. 4C, the upper portion of the airbag cushion part 130 may be folded in a band shape in the opposite direction that the folded portion is loaded at the rear surface. Then, as illustrated in FIGS. 4D to 4F, the upper portion of the airbag cushion part 130 may be repeatedly folded in a band shape in a zigzag manner. The upper portion of the airbag cushion part 130 may be folded four to six times, and the number of times that the airbag cushion part 130 is folded can be changed to various values.

FIG. 4F illustrates that the folding of the upper portion of the airbag cushion part 130 in a zigzag manner is completed. FIG. 5A illustrates that the airbag cushion part 130 of FIG. 4F is turned over to switch the front and rear surfaces. As illustrated in FIGS. 4A to 4F, the upper portion of the airbag cushion part 130 may be folded in a zigzag manner. Then, as illustrated in FIGS. 5A to 5E, both side portions of the airbag cushion part 130 may be folded toward the central portion.

Figure 5B:
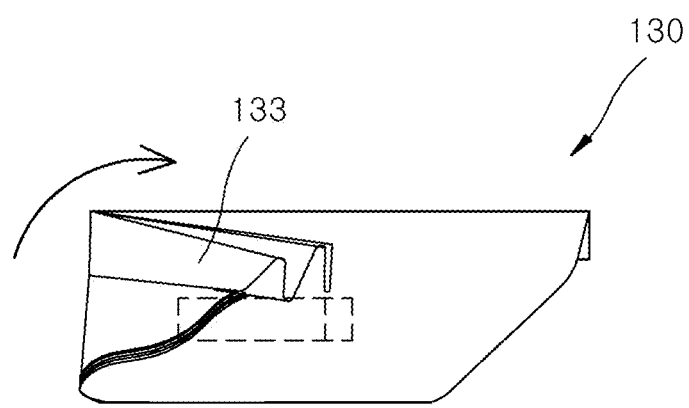
Figure 5C:
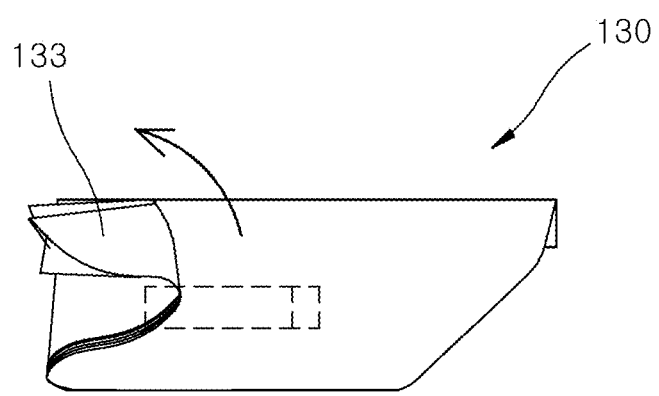
Figure 5D:
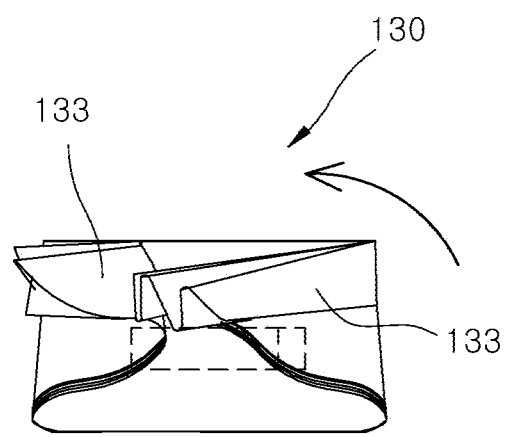
Figure 5E:
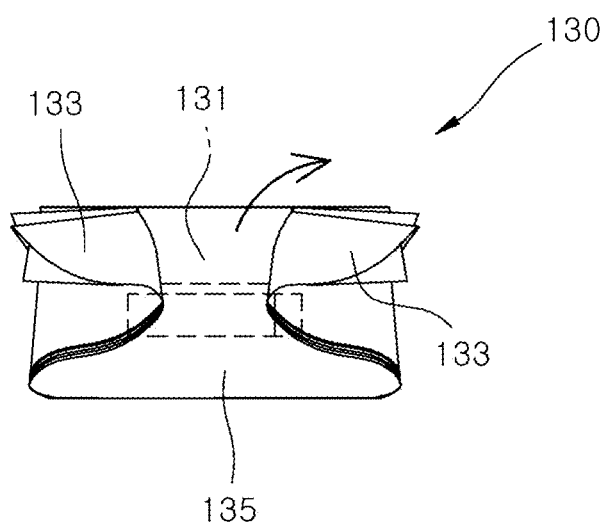
Figure 6A:
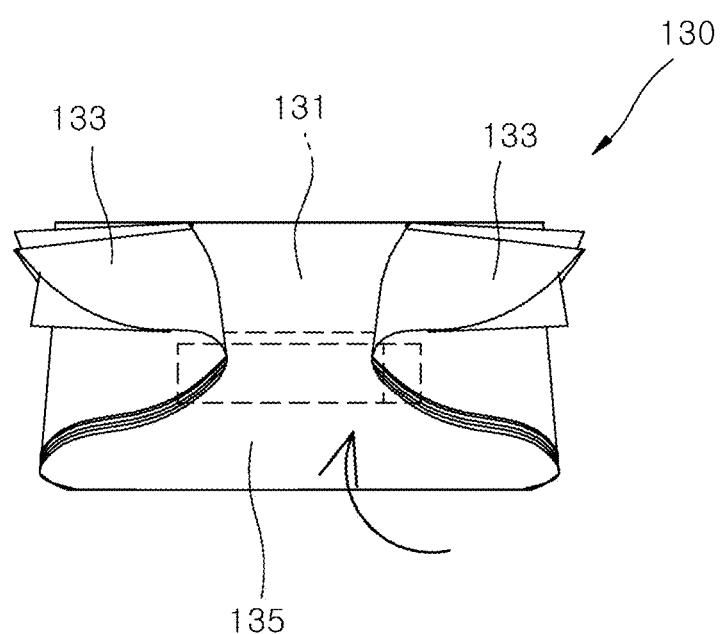
FIGS. 6A and 6B are plan views sequentially illustrating that the airbag cushion part is folded to form a cover folding part in the knee airbag apparatus in accordance with the embodiment of the present invention.
Figure 6B:
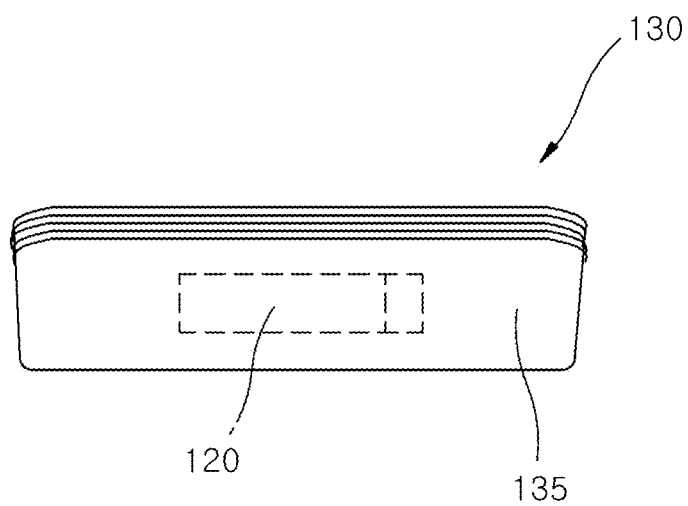

Specifically, one side portion (left side in FIG. 5A) of the airbag cushion part 130 may be folded as illustrated in FIG. 5B, and then folded in the opposite direction as illustrated in FIG. 5C. That is, the side portion of the airbag cushion part 130 of FIG. 5A may be folded in a zigzag manner through the steps of FIGS. 5B and 5C. Similarly, the other side portion of the airbag cushion part 130 of FIG. 5C may be folded in a zigzag manner through steps of FIGS. 5D and 5E.

Both side portions of the airbag cushion part 130 folded the plurality of times may be folded toward the central portion in order to stack the side folding parts 133 over the main folding part 131. At this time, the main folding part 131 may correspond to the portion between both side portions of the structure formed by folding the airbag cushion part 130 the plurality of times, and the side folding parts 133 may correspond to portions formed by folding both side portions of the structure toward the central portion.

In other words, referring to FIGS. 5A to 5E, the portions folded in a zigzag manner in the one side portion and the other side portion of the airbag cushion part 130 may correspond to the side folding parts 133, and the portion connecting one side folding part 133 to the other side folding part 133 may correspond to the main folding part 131.

One surface of the airbag cushion part 130, on which the main folding part 131 is disposed, may be positioned at the bottom, and the other surface on which the main folding part 131 is not disposed may be positioned at the top.

The side folding parts 133 may be formed by folding side portions connected the main folding part 131 toward the longitudinal central portion of the inflator 120 (central portion of the main folding part 131), and then folding the side portions in the opposite directions. The side folding part 133 has a twice-folded structure. Furthermore, after the one side folding part 133 is folded, the other side folding part 133 may be folded. Both of the side folding parts 133 may be separated from each other.

At this time, the main folding part 131 may be positioned at one surface of the airbag cushion part 130. Then, the airbag cushion part 130 may be turned over, and both side portions of the airbag cushion part 130 may be folded toward the other surface in order to form the side folding parts 133.

The cover folding part 135 may be formed to cover the pair of side folding parts 133 such that the pair of side folding parts 133 can be symmetrically deployed. Since the cover folding part 135 is folded to cover the pair of side folding parts 133, the cover folding part 135 may be unfolded before the pair of side folding parts 133.

The cover folding part 135 may be disposed at the foremost position in the deployment direction of the airbag cushion part 130 or the closest position to the door 115, and thus deployed to open the door 115. Since the cover folding part 135 is disposed in the deployment direction of the airbag cushion part 130, the cover folding part 135 may be expanded and deployed to open the door 115.

The cover folding part 135 may be folded to cover the side folding parts 133 in the opposite direction of the direction that the main folding part 131 is folded, based on the inflator 120. Since the cover folding part 135 is folded in the opposite side of the main folding part 131, the cover folding part 135 may be expanded and deployed before the main folding part 131. Furthermore, since the expansion of the cover folding part 135 is not restricted by the main folding part 131 and the side folding part 133, gas injection may be concentrated on the cover folding part 135 at the initial stage that gas is injected by the inflator 120. Therefore, the cover folding part 135 may be first unfolded in the airbag cushion part 130, and thus open the door 115.

The operation of the knee airbag apparatus in accordance with the embodiment of the present invention will be described.

Figure 7:
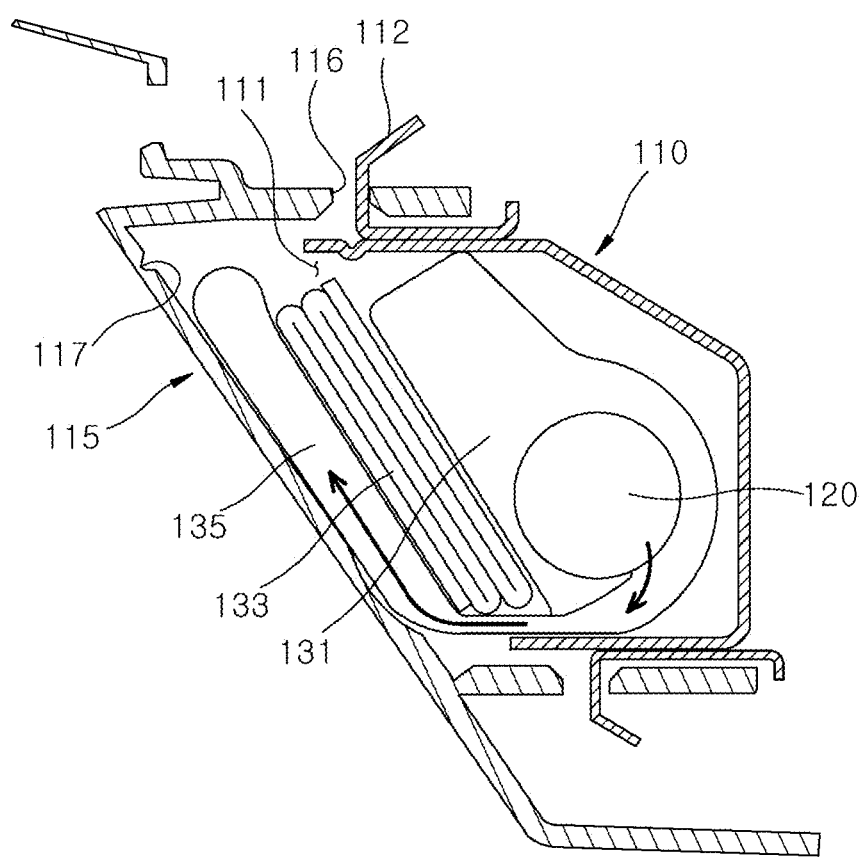
FIG. 7 is a side view illustrating that the cover folding part of the airbag cushion part is expanded in the knee airbag apparatus in accordance with the embodiment of the present invention.
Figure 8:
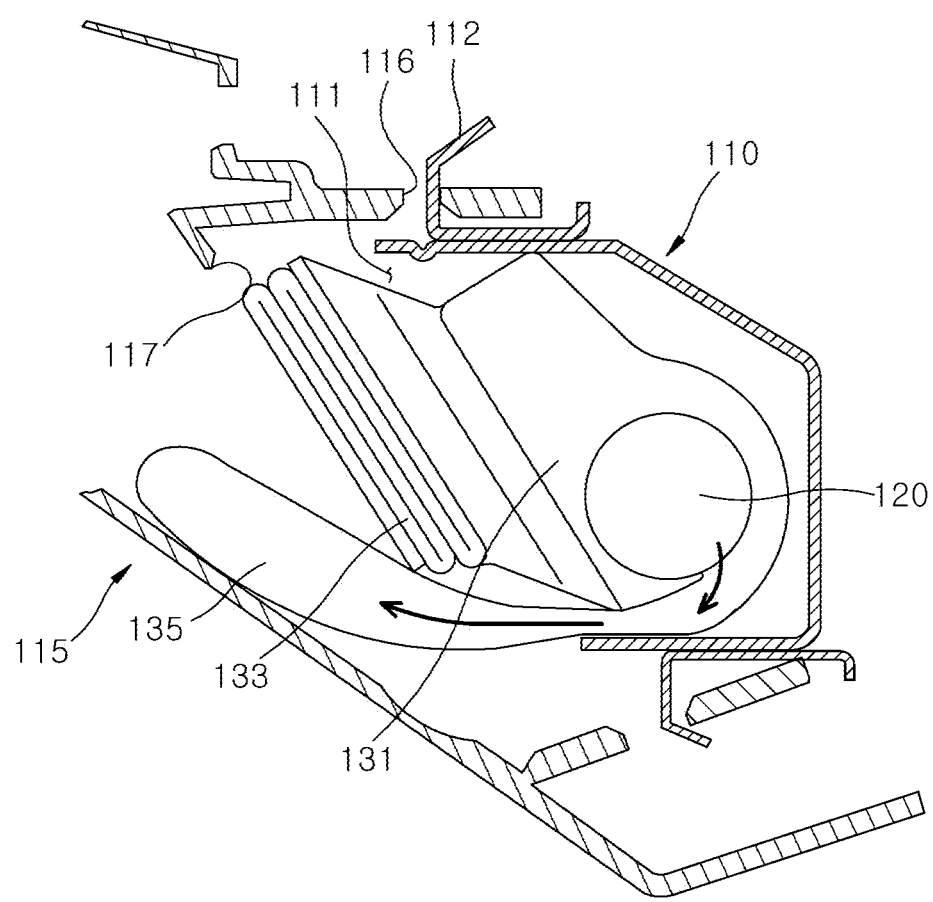
FIG. 8 is a side view illustrating that the cover folding part is expanded to open the door in the airbag cushion part of the knee airbag apparatus in accordance with the embodiment of the present invention.
Figure 9:
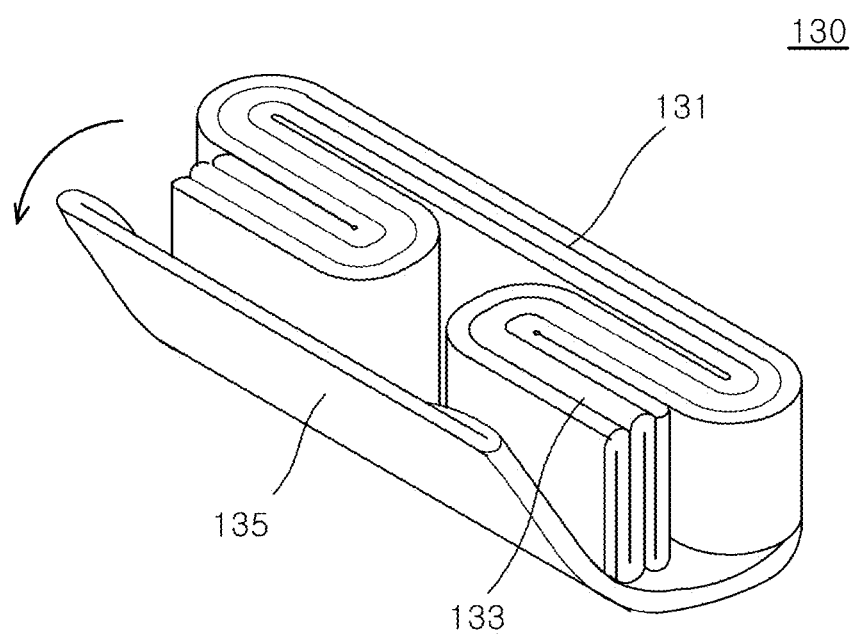
FIG. 9 is a perspective view illustrating that the cover folding part is deployed in the airbag cushion part of the knee airbag apparatus in accordance with the embodiment of the present invention.
Figure 10:
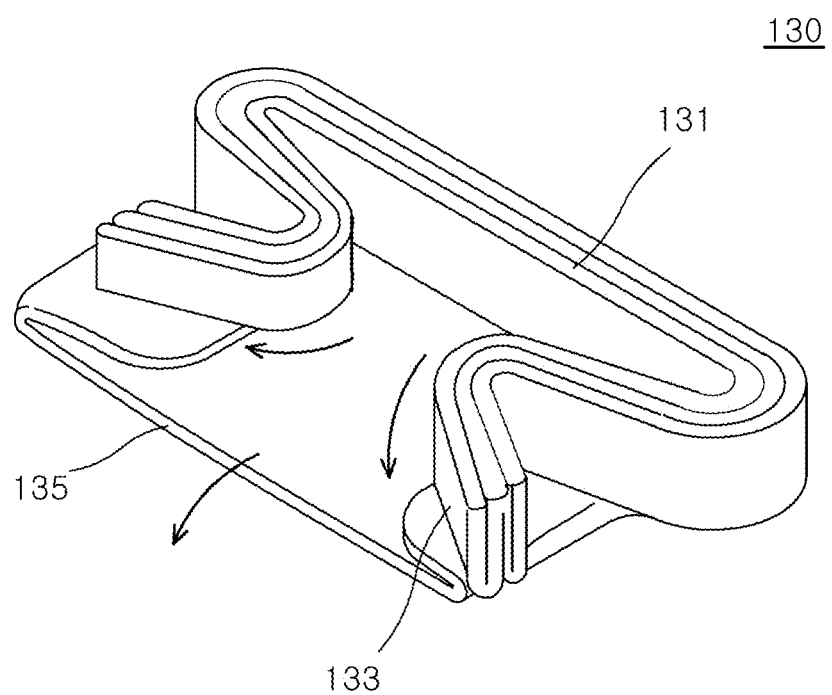
FIG. 10 is a perspective view illustrating that the side folding parts are deployed in the airbag cushion part of the knee airbag apparatus in accordance with the embodiment of the present invention.

FIG. 7 is a side view illustrating that the cover folding part of the airbag cushion part is expanded in the knee airbag apparatus in accordance with the embodiment of the present invention, FIG. 8 is a side view illustrating that the cover folding part is expanded to open the door in the airbag cushion part of the knee airbag apparatus in accordance with the embodiment of the present invention, FIG. 9 is a perspective view illustrating that the cover folding part is deployed in the airbag cushion part of the knee airbag apparatus in accordance with the embodiment of the present invention, and FIG. 10 is a perspective view illustrating that the side folding parts are deployed in the airbag cushion part of the knee airbag apparatus in accordance with the embodiment of the present invention.

Referring to FIGS. 7 to 10, when the vehicle collides or a shock is applied to the vehicle, gas may be discharged from the inflator 120. Since the gas outlet of the inflator 120 is connected to the main folding part 131 and the cover folding part 135, the gas may be supplied to the main folding part 131 and the cover folding part 135 at the same time.

At this time, since the side folding parts 133 and the cover folding part 135 are stacked at the front side, the expansion of the main folding part 131 may be restricted. However, since the cover folding part 135 is disposed at the outermost position and not restricted, gas injection may be concentrated on the cover folding part 135. The cover folding part 135 may be expanded and deployed before the main folding part 131 and the side folding parts 133. At this time, since the cover folding part 135 presses the main folding part 131 and the side folding parts 133, the deployment of the main folding part 131 and the side folding parts 133 may be restricted until the door 115 is opened. While the cover folding part 135 is expanded and deployed, the side folding parts 133 may be slowly expanded.

When the cover folding part 135 is expanded and deployed, the side folding parts 133 and the main folding part 131 may be slowly expanded. However, FIGS. 9 and 10 illustrate that the cover folding part 135 and the side folding parts 133 are not yet expanded, in order to promote understanding of the process in which the cover folding part 135 and the side folding parts 133 are deployed.

Since the expansion force of the cover folding part 135 is applied to the door 115 when the cover folding part 135 is expanded, the door 115 may be opened by the expansion force of the cover folding part 135. As the expansion force of the cover folding part 135 is applied to the door 115, the cutting induction part 117 of the door 115 may be torn or cut. Then, the door 115 may be separated into upper and lower portions based on the cutting induction part 117. The upper portion of the door 115 may be locked to the hook part 112, and the lower portion of the door 115 may be moved downward. As the door 115 is opened, the cover folding part 135 may be moved downward with the door 115.

Then, as the gas injection is concentration on the side folding parts 133, the side folding parts 133 may be expanded to the outside through the opening 11 of the housing 110. Since the side folding parts 133 are deployed and unfolded from both sides of the airbag cushion part 130, the width of the airbag cushion part 130 may be increased. At this time, when the cover folding part 135 is expanded and deployed from both sides of the airbag cushion part 130, the main folding part 131 may also be expanded and deployed.

The main folding part 131 may be expanded and deployed from the state in which the main folding part 131 has been folded in a zigzag manner. The main folding part 131 may be expanded and deployed upward to cover the knees and shins of a passenger. Therefore, the knees and shins of the passenger can be protected by the airbag cushion part 130.

In accordance with the embodiments of the present invention, since the cover folding part is folded to cover the pair of side folding parts, the cover folding part may block the side folding parts until the door is opened, thereby restricting the deployment of the side folding parts. When the door is opened by the cover folding part, the pair of side folding parts may be symmetrically deployed.

Furthermore, since the pair of side folding parts are symmetrically deployed, the airbag cushion part can be prevented from turning or swaying while being deployed.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A knee airbag apparatus for use in a vehicle comprising:
a housing comprising an opening and an airbag door covering the opening, wherein the opening is to face a passenger when installed in the vehicle;
an airbag cushion installed in the housing in a folded state;
an inflator installed in the housing and connected to the airbag cushion, wherein the inflator is configured to inject gas into the airbag cushion in response to a collision of the vehicle such that the airbag cushion expands to an unfolded state,
wherein, in the unfolded state, the airbag cushion comprises a lower portion, an upper portion, and an intermediate portion interposed between and connecting the lower portion and the upper portion,
wherein when the airbag cushion is in the folded state inside the housing, the upper portion is folded and placed over the intermediate portion, and the lower portion is placed over the folded upper portion and next to the airbag door such that the airbag door, the lower portion, the folded upper portion and the intermediate portion are the arranged in order when view from the passenger, wherein when the airbag cushion is deployed, the lower portion is configured to inflate prior to the folded upper portion such that the inflating lower portion is configured to push the airbag door, which causes the airbag door to be detached from the housing before the folded upper portion inflates.

2. The apparatus of claim 1, wherein in the folded state, the upper portion is folded in a zigzag manner.

* * * * *